United States Patent [19]
Gampe

[11] 3,790,329
[45] Feb. 5, 1974

[54] APPARATUS FOR GRIPPING AND SEPARATING RESPECTIVELY OF A HOSE EMERGING FROM AN EXTRUDER AND FOR ITS FEEDING INTO A DIVISIBLE BLOWING FORM BY MEANS OF A BLOWING DEVICE FOR HOLLOW BODIES

[75] Inventor: Egon Gampe, Monheim, Germany
[73] Assignee: Rheinmetall GmbH, Dusseldorf, Germany
[22] Filed: Apr. 23, 1971
[21] Appl. No.: 136,759

[52] U.S. Cl. .............. 425/387 B, 214/1 BB, 294/88, 425/436, 425/DIG. 213
[51] Int. Cl. ............................................ B29b 23/03
[58] Field of Search 425/387, 326 B, 436, DIG. 213; 214/1 BB; 294/88, 106

[56] References Cited
UNITED STATES PATENTS
3,616,490 11/1971 Szabo ............................ 425/326 B
3,212,129 10/1965 Craig et al. ................... 425/326 B X
3,363,929 1/1968 Nelson ................................. 294/88
3,127,209 3/1964 Faust et al. ........................... 294/88

FOREIGN PATENTS OR APPLICATIONS
1,110,610 4/1968 Great Britain ..................... 425/326
202,660 3/1966 Sweden ............................. 425/326

Primary Examiner—Robert L. Spicer, Jr.
Attorney, Agent, or Firm—Ernest G. Montague

[57] ABSTRACT

An apparatus for gripping and separating a hose of synthetic material emerging from an extruder and its feeding into a divisible mold in blowing devices for hollow bodies which comprises a holding member, two legs mounted at one end thereof in the holding member, swingable in a horizontal plane and movable relative to each other. Ledges for gripping and separating, respectively, of the hose are disposed in the legs. A mold-closing coupling member of the legs is arranged for a symmetrical movement in opposite directions upon operation of one of the legs.

6 Claims, 3 Drawing Figures

PATENTED FEB 5 1974 3,790,329

APPARATUS FOR GRIPPING AND SEPARATING RESPECTIVELY OF A HOSE EMERGING FROM AN EXTRUDER AND FOR ITS FEEDING INTO A DIVISIBLE BLOWING FORM BY MEANS OF A BLOWING DEVICE FOR HOLLOW BODIES

The present invention relates to an apparatus for gripping and separating, respectively, of a hose emerging from an extruder and to its feeding into a divisible blow-mold of a blowing device for hollow bodies, and to the application of the apparatus for thermoplastic material.

Thermoplastic hollow bodies produced in a blowing process are mostly manufactured by using an intermediate product in form of a hose, which emerges from a vertically disposed annular spray nozzle of an extruder and is fed into a divisible hollow mold of the blowing machine.

During working of predetermined working material, a continuous production of the hose is required and the possibility must be created, to permit the hose to emerge freely, during which time period the hollow body is blown in the mold and is removed from the mold after hardening. During production of comparatively smaller blowing products, one operates with movable molds, that means, the open mold is rolled directly below the extruder head. Upon receiving a sufficient hose length, the mold is closed, whereby the hose is separated below the extruder head. Immediately upon closing, the mold is removed from the emerging range of the extruder head, so that the hose produced in the extruder head can move out without any difficulty.

During the production of comparatively larger blowing products, the movement of correspondingly heavier molds is cumbersome, and one provides in this case a particular hose gripper, which grips the emerging hose upon reaching the required length and transports the same to the mold disposed in suitable distance by example below the extruder head.

The known hose grippers comprise mostly two parallel ledges, which can be moved toward each other by means of a drive and thereby clamp the hose. An exact parallel guide of the gripper ledges is, however, constructively difficult and expensive, in particular, if it is of essence to grip simultaneously hoses emerging from a plurality of spraying heads disposed adjacent each other.

It is one object of the present invention, to provide an apparatus for gripping and separating, respectively, a hose emerging from an extruder, which provides a suitable gripping device for the hose-like intermediate product, which gripping device is free from disturbances, and beyond that, is simple in its structure, and furthermore permits comparatively small structure dimensions.

It is another object of the present invention, to provide an apparatus for gripping and separating, respectively, a hose emerging from an extruder, wherein two legs mounted at one end in carrying device, which legs are swingable in a horizontal plane and movable relative to each other, on which legs are provided ledges for gripping and under circumstances separating of the hose, and by a forced coupling of the two legs such, that the latter perform, upon driving of one leg, a symmetrically opposite movement.

In this manner, first of all, due to the omission of any parallel guides, a disturbance-free and exact movement of the gripping legs is brought about. An advantageous, constructively simple and as to the driving favorable embodiment of the device, has the characteristic that the legs are swingable about a bearing pin each, which bearing pins are disposed spaced apart from each other crosswise to the swinging plane in the carrier, and the bearing eyes of the legs are forcibly coupled together by the gearing provided over a part range of the periphery.

The gripping device can be widened in a simple manner to the transportation device in a simple manner such, that the bearing pins are provided at the ends of two rods guided in longitudinal guides, which rods jointly with the carrier and the gripping legs are movable by a piston-cylinder drive in vertical direction.

In a further advantageous embodiment of the present invention, the ledges are settable at their end pointing to the swinging axis in the swinging plane and supported resiliently in the legs. By this arrangement, an exact setting of the legs is possible, so that, also upon gripping of a plurality of hoses, a safe gripping is assured.

With these and other objects in view which will become apparent in the following detailed description, the present invention will be clearly understood in connection with accompanying drawing, in which.

Figure 1:
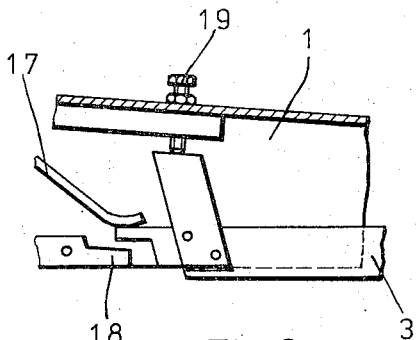
FIG. 1 is an elevation of a gripping and transportation device designed in accordance with the present invention.
Figure 3:
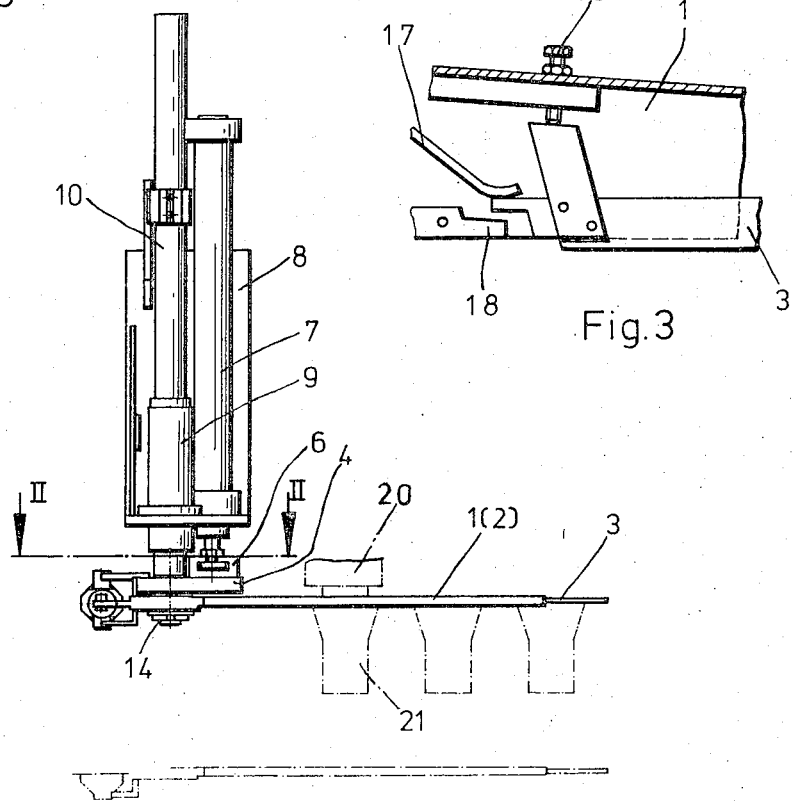
FIG. 3 is a fragmentary elevation of a part shown in FIG. 2.
Figure 2:
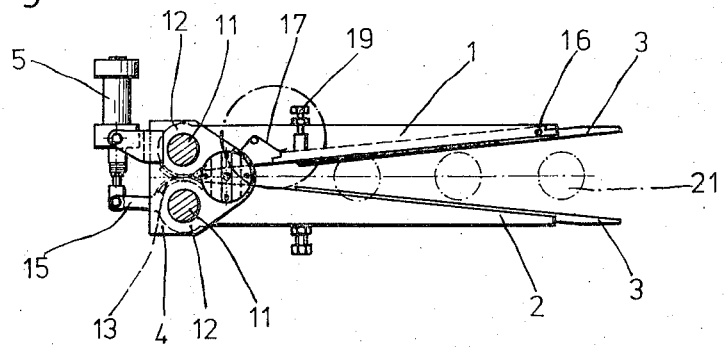
FIG. 2 is a section along the lines II—II.

Referring now to the drawing, the gripping device comprises in its essential parts legs 1 and 2, with gripping ledges 3, a carrier 4, and a drive 5. By means of a coupling member 6 secure to the carrier, the gripping device is connected with a piston-cylinder-drive 7, which is arranged on a base frame 8. By means of the piston-cylinder-drive 7 the gripping device can be moved in vertical direction into the position indicated in point dotted lines in FIG. 1. The gripping device moves thereby in a longitudinal guide 9 disposed likewise on the base frame 8, in which longitudinal guide 9 are guided two guide rods 10. The carrier 4 with the gripping legs slides on the lower ends of the guide rods 10 formed as bearing pins 11, and is retained by means of a setting ring 14. The gripper legs 1 and 2 are in this manner swingable with their bearing eyes about the bearing pins 11. In order to obtain a uniform movement, the bearing eyes have a gearing 13 on a part range of their periphery, which gearings are in mesh with each other. By the engagement of the piston cylinder drive secured to the carrier 4, the piston rod of the drive being pivoted by means of a lever arm 15 to one of the bearing eyes 12, the legs are moved synchronously.

In order to obtain an exact parallel position of the ledges 3 in the gripping position, the latter are held settable in the legs consisting of U-shaped bent metal sheets. For this purpose, the ledges are swingable near the outer end of the legs about a pin 16, while their ends pointing towards the swinging axes are supported yieldingly against a spring 17 The possible spring path is limited by an abutment 18 and by a set screw 19.

The gripping device is capable in this manner of gripping safely simultaneously a plurality of hoses emerging from extruder heads of the extruders. This case is demonstrated in FIG. 1, which shows the gripping device in its closed position, whereby three hoses 21 emerging from extruder heads 20 are gripped simultaneously by the gripper legs.

While I have disclosed one embodiment of the present invention, it is to be understood that this embodiment is given by example only and not in a limiting sense.

I claim:

1. An apparatus for gripping and separating at least one hose of synthetic material emerging from an extruder and its feeding into a divisible mold in blowing devices for hollow bodies, comprising
    a holding member,
    two legs mounted at one end thereof in said holding member, swingable in a horizontal plane and movable relative to each other,
    a bearing pin for each of said legs swingably mounting the latter,
    said bearing pins are disposed spaced apart from each other crosswise to the swinging plane in said holding member,
    a mold-closing coupling means of said legs for providing a symmetrical movement in opposite directions of said two legs upon operation of one of said legs,
    two rods guided in longitudinal guides,
    said bearing pins are mounted at the end of each of said two rods, and
    a piston-cylinder drive moving said rods jointly with said holding member and said legs in vertical direction.

2. An apparatus for gripping and separating at least one hose of synthetic material emerging from an extruder and its feeding into a divisible mold in blowing devices for hollow bodies, comprising
    a holding member,
    two legs mounted at one end thereof in said holding member, swingable in a horizontal plane and movable relative to each other,
    a bearing pin for each of said legs swingably mounting the latter
    said bearing pins are disposed spaced apart from each other crosswise to the swinging plane in said holding member,
    a mold-closing coupling means of said legs for providing a symmetrical movement in opposite directions of said two legs upon operation of one of said legs,
    ledges for gripping and separating, respectively, of said at least one hose and pivotally mounted on said legs, respectively,
    said ledges at their end pointing towards the pivoting axis are settable in the pivoting plane and resiliently supported in said legs.

3. The apparatus as set forth in claim 1, wherein
    said legs include bearing eyes and the latter have a toothed wheel work on part of the range of their peripheries for forced coupling together said legs.

4. The apparatus, as set forth in claim 2,
    said legs include bearing eyes and the latter have a toothed wheel work on part of the range of their peripheries for forced coupling together said legs.

5. The apparatus as set forth in claim 4, wherein
    two rods are guided in longitudinal guides,
    said bearing pins are mounted at the end of each of said two rods, and
    a piston-cylinder drive moving said rods jointly with said holding member and said legs in vertical direction.

6. The apparatus, as set forth in claim 1, further comprising
    ledges for gripping and separating, respectively, of said at least one hose and pivotally mounted on said legs, respectively,
    said ledges at their end pointing towards the pivoting axis are settable in the pivoting plane and resiliently supported in said legs.

* * * * *

UNITED STATES PATENT OFFICE
CERTIFICATE OF CORRECTION

Patent No. 3,790,329            Dated Egon Gampe

Inventor(s) Egon Gampe

It is certified that error appears in the above-identified patent and that said Letters Patent are hereby corrected as shown below:

On the cover sheet insert

-- [30] Foreign Application Priority Data

Apr. 25, 1970          Germany          P2020323.0

Signed and sealed this 10th day of September 1974.

(SEAL)
Attest:

McCOY M. GIBSON, JR.          C. MARSHALL DANN
Attesting Officer              Commissioner of Patents